United States Patent
Wang

(10) Patent No.: US 11,153,816 B2
(45) Date of Patent: Oct. 19, 2021

(54) METHOD AND APPARATUS FOR TERMINAL DEVICE TO ACCESS A NETWORK

(71) Applicant: Huawei Technologies Co., Ltd., Shenzhen (CN)

(72) Inventor: Yuan Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/778,943

(22) Filed: Jan. 31, 2020

(65) Prior Publication Data
US 2020/0169952 A1 May 28, 2020

Related U.S. Application Data

(63) Continuation of application No. PCT/CN2018/097615, filed on Jul. 27, 2018.

(30) Foreign Application Priority Data

Jul. 31, 2017 (CN) .......................... 201710640374.3

(51) Int. Cl.
H04W 48/18 (2009.01)
H04W 76/25 (2018.01)
(Continued)

(52) U.S. Cl.
CPC ............ *H04W 48/18* (2013.01); *H04W 76/11* (2018.02); *H04W 76/25* (2018.02); *H04W 84/042* (2013.01)

(58) Field of Classification Search
CPC ..... H04W 48/18; H04W 76/25; H04W 76/11; H04W 84/042; H04W 48/12; H04W 48/08; H04W 48/16
See application file for complete search history.

(56) References Cited

U.S. PATENT DOCUMENTS

| 2010/0322216 A1 | 12/2010 | Roger et al. |
| 2015/0156687 A1 | 6/2015 | Wu et al. |
(Continued)

FOREIGN PATENT DOCUMENTS

| CN | 101877904 A | 11/2010 |
| CN | 101940033 A | 1/2011 |
(Continued)

OTHER PUBLICATIONS

Huawei, "Network Slice instance selection," SA WG2 Meeting #122, S2-175223, Jun. 26-30, 2017, Cabo, Mexico, 21 pages.
(Continued)

*Primary Examiner* — Brandon J Miller
(74) *Attorney, Agent, or Firm* — Conley Rose, P.C.

(57) ABSTRACT

An information transmission method and apparatus, such that a terminal device can correctly access a network. The method includes: obtaining, by a core network device, updated first network selection information of a terminal device; obtaining, by the core network device, identifier information of at least one public land mobile network (PLMN) and a correspondence between network slice selection assistance information and network selection information in the at least one PLMN; determining based on the updated first network selection information and the correspondence, target network slice selection assistance information corresponding to the at least one PLMN; and sending to the terminal device, the identifier information of the at least one PLMN and the target network slice selection assistance information corresponding to the at least one PLMN.

20 Claims, 7 Drawing Sheets

(51) Int. Cl.
*H04W 76/11* (2018.01)
*H04W 84/04* (2009.01)

(56) References Cited

U.S. PATENT DOCUMENTS

| | | | |
|---|---|---|---|
| 2015/0319737 A1* | 11/2015 | Cheng | H04W 76/14 370/329 |
| 2016/0234725 A1 | 8/2016 | Paczkowski et al. | |
| 2017/0303259 A1* | 10/2017 | Lee | H04W 12/08 |
| 2018/0270745 A1 | 9/2018 | Jeong et al. | |
| 2018/0324690 A1 | 11/2018 | Wang et al. | |
| 2019/0174321 A1 | 6/2019 | Sun et al. | |
| 2019/0174536 A1 | 6/2019 | Han et al. | |
| 2019/0230584 A1 | 7/2019 | Lou et al. | |
| 2019/0357129 A1* | 11/2019 | Park | H04W 60/00 |

FOREIGN PATENT DOCUMENTS

| | | |
|---|---|---|
| CN | 103875264 A | 6/2014 |
| CN | 104837183 A | 8/2015 |
| CN | 105376817 A | 3/2016 |
| CN | 106572516 A | 4/2017 |
| CN | 107438245 A | 12/2017 |
| CN | 107580360 A | 1/2018 |
| CN | 107734708 A | 2/2018 |
| JP | 2018538744 A | 12/2018 |
| JP | 2019506108 A | 2/2019 |
| WO | 2017086647 A1 | 5/2017 |
| WO | 2017113109 A1 | 7/2017 |
| WO | 2017124286 A1 | 7/2017 |

OTHER PUBLICATIONS

"3rd Generation Partnership Project; Technical Specification Group Services and System Aspects; System Architecture for the 5G System; Stage 2 (Release 15)," 3GPP TS 23.501, V1.2.0, Jul. 26, 2017, 166 pages.

* cited by examiner

METHOD AND APPARATUS FOR TERMINAL DEVICE TO ACCESS A NETWORK

CROSS-REFERENCE TO RELATED APPLICATIONS

This application is a continuation of International Patent Application No. PCT/CN2018/097615, filed on Jul. 27, 2018, which claims priority to Chinese Patent Application No. 201710640374.3, filed on Jul. 31, 2017. The disclosures of the aforementioned applications are hereby incorporated by reference in their entireties.

TECHNICAL FIELD

Embodiments of this application relate to the communications field, and more specifically, to an information transmission method and apparatus in the communications field.

BACKGROUND

With evolution of a mobile communications network, different terminal devices have different communication features in different application fields. Therefore, different communication features are generated and correspond to different types of terminal devices, for example, a machine type communication (MTC) terminal device, a vehicle type communication (VTC) terminal device, or a public safety communication (PSC) terminal device. Different types of terminal devices may correspond to different communication requirements. For example, different terminal devices may correspond to requirements of different services, and different terminal devices may correspond to different congestion mechanisms. With a continuous increase of terminal devices in the communications network, different core network devices may be deployed for terminal devices having different communication features, for example, the core network device may be referred to as a dedicated core network (DCN) device or a network slice. In this way, one dedicated core network device may be deployed for terminal devices having a same feature, such that an operator can effectively manage and maintain the terminal devices having the same feature, thereby reducing network maintenance costs. In an actual application process, when a communication feature of a terminal device changes (for example, the communication feature of the terminal device changes from machine type communication to vehicle type communication), or network deployment of a core network device changes (for example, the core network device changes from supporting a machine type terminal device to supporting a vehicle type terminal device), how to ensure that the terminal device correctly accesses a network corresponding to the terminal device is an urgent problem to be resolved.

SUMMARY

Embodiments of this application provide an information transmission method and apparatus, such that a terminal device can correctly access a network.

According to a first aspect, an information transmission method is provided, including: obtaining, by a core network device, updated first network selection information of a terminal device; obtaining, by the core network device, identifier information of at least one public land mobile network (PLMN), and a correspondence between network slice selection assistance information and network selection information in the at least one PLMN, where the network selection information in the at least one PLMN includes the updated first network selection information; determining, by the core network device based on the updated first network selection information and the correspondence, target network slice selection assistance information corresponding to the at least one PLMN; and sending, by the core network device to the terminal device, the identifier information of the at least one PLMN and the target network slice selection assistance information corresponding to the at least one PLMN.

Therefore, according to the information transmission method provided in the embodiments of this application, the core network device sends, to the terminal device, the identifier information of the at least one PLMN and the target network slice selection assistance information corresponding to the at least one PLMN that are determined based on the updated first network selection information and the correspondence. In this way, the terminal device may update or store the target network slice selection assistance information corresponding to the at least one PLMN. When the terminal device moves to any of the at least one PLMN, even if a type of the terminal device changes or a network accessed by the terminal device is changed, corresponding network slice selection assistance information can be found. Therefore, it can be ensured that the terminal device correctly accesses the network.

In some implementations, the at least one PLMN includes a PLMN currently accessed by the terminal device and/or a PLMN alternatively accessed by the terminal device. The PLMN alternatively accessed by the terminal device may be a PLMN that may be accessed by the terminal device later, for example, a PLMN that may be accessed in a roaming area.

Optionally, obtaining, by the core network device, identifier information of at least one PLMN includes determining, by the core network device, identifier information of the alternatively accessed PLMN in the at least one PLMN based on identifier information of the PLMN currently accessed by the terminal device. In other words, there may be a mapping relationship between the currently accessed PLMN and the alternatively accessed PLMN.

Optionally, one PLMN may correspond to one piece of target network slice selection assistance information, or a plurality of PLMNs may correspond to one piece of target network slice selection assistance information, or a plurality of PLMNs may correspond to a plurality of pieces of target network slice selection assistance information. This is not limited in the embodiments of this application.

In some implementations, the core network device sends first indication information to the terminal device, and the first indication information is used to instruct the terminal device to store the identifier information of the at least one PLMN and the target network slice selection assistance information.

In some implementations, the core network device is an access and mobility management function (AMF) device. Additionally, determining, by the core network device based on the updated first network selection information and the correspondence, target network slice selection assistance information corresponding to the at least one PLMN includes: when the AMF device receives a non-access stratum (NAS) request message sent by the terminal device, determining, by the AMF device based on the updated first network selection information and the correspondence, the target network slice selection assistance information corresponding to the at least one PLMN. Further, sending, by the core network device to the terminal device, the identifier information of the at least one PLMN and the target network slice selection assistance information corresponding to the at least one PLMN includes sending, by the core network device, the identifier information of the at least one PLMN and the target network slice selection assistance information to the terminal device using a response message of the NAS request message.

In some implementations, the response message of the non-access stratum request message includes the first indication information.

In some implementations, the core network device is an AMF device. Additionally, sending, by the core network device to the terminal device, the identifier information of the at least one PLMN and the target network slice selection assistance information corresponding to the at least one PLMN includes sending, by the AMF device to the terminal device using a non-access stratum NAS message, the identifier information of the at least one PLMN and the target network slice selection assistance information corresponding to the at least one PLMN.

Optionally, the non-access stratum message may be temporary redistribution identifier information.

In some implementations, the core network device is the AMF device. Additionally, obtaining, by a core network device, updated first network selection information of a terminal device includes receiving, by the AMF device, the updated first network selection information of the terminal device that is sent by a subscription database. Further, obtaining, by the core network device, identifier information of at least one PLMN, and a correspondence between network slice selection assistance information and network selection information in the at least one PLMN includes receiving, by the AMF device, the correspondence between network slice selection assistance information and network selection information in the at least one PLMN, and the identifier information of the at least one PLMN that are sent by a policy control function (PCF) device or the subscription database.

Optionally, the PCF device periodically sends a network policy to the AMF device. Alternatively, the AMF device may send a request message to the PCF device, to request a network policy using the request message. For example, the network policy includes a roaming agreement. The roaming agreement is a cooperation agreement signed among a plurality of operators. The cooperation agreement allows a terminal device of a local network to roam to a network of a partner operator, such that the terminal device of the local network obtains a service from the partner operator. The roaming agreement may specify a correspondence between a PLMN in at least one PLMN and a service supported by the PLMN. Optionally, the roaming agreement may include identifier information of a plurality of PLMNs and service types or slice types supported by the plurality of PLMNs.

Optionally, determining, by the AMF device, the target network slice selection assistance information corresponding to the at least one PLMN includes: receiving, by the AMF device, target network slice selection assistance information corresponding to a PLMN that is sent by the subscription database; and determining, based on the target network slice selection assistance information corresponding to the PLMN and a second mapping relationship, the target network slice selection assistance information corresponding to the at least one PLMN, where the second mapping relationship is used to indicate a mapping relationship between the target network slice selection assistance information corresponding to the PLMN and the target network slice selection assistance information corresponding to the at least one PLMN.

In some implementations, the core network device is a PCF device, and obtaining, by a core network device, updated first network selection information of a terminal device includes receiving, by the PCF device, the updated first network selection information of the terminal device that is sent by a subscription database using an AMF device. Additionally, obtaining, by the core network device, identifier information of at least one PLMN, and a correspondence between network slice selection assistance information and network selection information in the at least one PLMN includes: obtaining, by the PCF device, the identifier information of the at least one PLMN based on a PLMN to which the PCF device belongs and/or a roaming agreement; and obtaining, by the PCF device, the correspondence stored in the PCF device. Further, sending, by the core network device to the terminal device, the identifier information of the at least one PLMN and the target network slice selection assistance information corresponding to the at least one PLMN includes sending, by the PCF device to the terminal device using the AMF device, the identifier information of the at least one PLMN and the target network slice selection assistance information corresponding to the at least one PLMN.

In some implementations, the core network device is a subscription database, and obtaining, by a core network device, updated first network selection information of a terminal device includes obtaining, by the subscription database, the updated first network selection information of the terminal device that is stored in the subscription database. Additionally, obtaining, by the core network device, identifier information of at least one PLMN, and a correspondence between network slice selection assistance information and network selection information in the at least one PLMN includes receiving, by the subscription database, the correspondence and the identifier information of the at least one PLMN that are sent by a PCF device. Further, sending, by the core network device to the terminal device, the identifier information of the at least one PLMN and the target network slice selection assistance information corresponding to the at least one PLMN includes sending, by the subscription database to the terminal device using an AMF device, the identifier information of the at least one PLMN and the target network slice selection assistance information corresponding to the at least one PLMN.

In some implementations, the network slice selection assistance information in the at least one PLMN includes slice type information, identifier information of a core network device that the terminal device currently needs to access, or type information of a core network device that the terminal device currently needs to access.

In some implementations, the network selection information in the at least one PLMN includes communication feature information of the terminal device or communication capability information of the terminal device.

According to a second aspect, an information transmission method is provided. The method includes: receiving, by a terminal device, identifier information of at least one PLMN and target network slice selection assistance information corresponding to the at least one PLMN that are sent by a core network device, where the identifier information of the at least one PLMN and the target network slice selection assistance information corresponding to the at least one PLMN include identifier information of a first PLMN and first network selection assistance information corresponding to the first PLMN; obtaining, by the terminal device, the identifier information of the first PLMN; determining the first network selection assistance information based on the identifier information of the first PLMN; and initiating, by the terminal device, an access request, where an access request message carries the first network selection assistance information.

In the embodiments of this application, when accessing the first PLMN, the terminal device may determine, based on the identifier information of the first PLMN and a correspondence, the first network selection assistance information corresponding to the first PLMN. In this way, when network slice selection assistance information and PLMN identifier information change, the terminal device can be prevented from incorrectly accessing an unchanged network. Therefore, in the embodiments of this application, the terminal device can correctly access the network.

In some implementations, the at least one PLMN includes a PLMN currently accessed by the terminal device and/or a PLMN alternatively accessed by the terminal device.

In some implementations, when the first PLMN is the alternatively accessed PLMN, obtaining, by the terminal device, the identifier information of the first PLMN includes obtaining, by the terminal device, the identifier information of the first PLMN that is sent by the core network device when accessing the first PLMN.

In some implementations, when the first PLMN is the currently accessed PLMN, obtaining, by the terminal device, the identifier information of the first PLMN includes obtaining, by the terminal device, the identifier information of the first PLMN that is obtained by the terminal device when the terminal device previously accesses the first PLMN.

In some implementations, before receiving, by a terminal device, identifier information of at least one PLMN and target network slice selection assistance information corresponding to the at least one PLMN that are sent by a core network device, the method further includes sending, by the terminal device, a non-access stratum request message to the core network device. Additionally, receiving, by a terminal device, identifier information of at least one PLMN and target network slice selection assistance information corresponding to the at least one PLMN that are sent by a core network device includes receiving, by the terminal device using a response message of the non-access stratum request message, the identifier information of the at least one PLMN and the target network slice selection assistance information corresponding to the at least one PLMN that are sent by the core network device.

In some implementations, the method further includes receiving, by the terminal device, first indication information sent by the core network device, where the first indication information is used to instruct the terminal device to store the identifier information of the at least one PLMN and the target network slice selection assistance information corresponding to the at least one PLMN. Optionally, the response message of the non-access stratum request message includes the first indication information.

In some implementations, receiving, by a terminal device, identifier information of at least one PLMN and network slice selection assistance information corresponding to the at least one PLMN that are sent by an AMF device includes receiving, by the terminal device, the identifier information of the at least one PLMN and the network slice selection assistance information corresponding to the at least one PLMN that are sent by the AMF device using a non-access stratum NAS message.

In some implementations, the network slice selection assistance information in the at least one PLMN includes slice type information, identifier information of a core network device that the terminal device currently needs to access, or type information of a core network device that the terminal device currently needs to access.

According to a third aspect, an information transmission apparatus is provided, and the information transmission apparatus is configured to perform the method in the first aspect or any possible implementation of the first aspect. For example, the apparatus includes units configured to perform the method in the first aspect or any possible implementation of the first aspect.

According to a fourth aspect, an information transmission apparatus is provided, and the information transmission apparatus is configured to perform the method in the second aspect or any possible implementation of the second aspect. For example, the apparatus includes units configured to perform the method in the second aspect or any possible implementation of the second aspect.

According to a fifth aspect, an information transmission apparatus is provided, and the apparatus includes a transceiver, a memory, and a processor. The transceiver, the memory, and the processor communicate with each other through an internal connection path. The memory is configured to store an instruction. The processor is configured to execute the instruction stored in the memory, to control a receiver to receive a signal and control a transmitter to send a signal. In addition, when the processor executes the instruction stored in the memory, the execution enables the processor to perform the method in any one of the first aspect or the possible implementations of the first aspect.

According to a sixth aspect, an information transmission apparatus is provided, and the apparatus includes a transceiver, a memory, and a processor. The transceiver, the memory, and the processor communicate with each other through an internal connection path. The memory is configured to store an instruction. The processor is configured to execute the instruction stored in the memory, to control a receiver to receive a signal and control a transmitter to send a signal. In addition, when the processor executes the instruction stored in the memory, the execution enables the processor to perform the method in any one of the second aspect or the possible implementations of the second aspect.

According to a seventh aspect, an information transmission system is provided, including the apparatus in any one of the third aspect or optional implementations of the third aspect and the apparatus in any one of the fourth aspect or optional implementations of the fourth aspect. Optionally, the system includes the apparatus in any one of the fifth aspect or optional implementations of the fifth aspect and the apparatus in any one of the sixth aspect or optional implementations of the sixth aspect.

According to an eighth aspect, the embodiments of this application provide a core network device. The core network device has a function of implementing behavior of the core network device in the foregoing method example. The function may be implemented by hardware, or may be implemented by hardware by executing corresponding software. The hardware or software includes one or more modules corresponding to the foregoing function.

In a possible design, a structure of the core network device includes a processing unit and a communications unit. The processing unit is configured to support the core network device in executing a corresponding function in the foregoing methods. The communications unit is configured to support the core network device in communicating with another device. The core network device may further include a storage unit coupled to the processing unit and configured to store a program instruction and data that are necessary for the core network device. In an example, the processing unit may be a processor, the communications unit may be a transceiver, and the storage unit may be a memory.

In another possible design, a structure of the core network device includes an obtaining unit, a processing unit, and a transceiver unit, and the units may perform corresponding functions in the foregoing method example. For details, refer to detailed description in the method example. Details are not described again.

According to a ninth aspect, the embodiments of this application provide a terminal device. The terminal device has a function of implementing behavior of the terminal device in the foregoing method example. The function may be implemented by hardware, or may be implemented by hardware by executing corresponding software. The hardware or software includes one or more modules corresponding to the foregoing function.

In a possible design, a structure of the terminal device includes a processing unit and a communications unit. The processing unit is configured to support the terminal device in executing a corresponding function in the foregoing methods. The communications unit is configured to support the terminal device in communicating with another device. The terminal device may further include a storage unit coupled to the processing unit and configured to store a program instruction and data that are necessary for the terminal device. In an example, the processing unit may be a processor, the communications unit may be a transceiver, and the storage unit may be a memory.

In another possible design, a structure of the terminal device includes a transceiver unit, an obtaining unit, and a processing unit, and the units may perform corresponding functions in the foregoing method example. For details, refer to detailed description in the method example. Details are not described again. According to another aspect, the embodiments of this application provide a communications system, and the system includes the core network device in the foregoing aspects. In another possible design, the system may further include another device interacting with the core network device in the solutions provided in the embodiments of this application.

According to a tenth aspect, the embodiments of this application provide a communications system, and the system includes the terminal device in the foregoing aspects. In another possible design, the system may further include another device interacting with the terminal device in the solutions provided in the embodiments of this application.

According to an eleventh aspect, the embodiments of this application provide a computer storage medium, configured to store a computer software instruction used by the foregoing core network device. The computer software instruction includes a program designed for executing the foregoing aspects.

According to a twelfth aspect, the embodiments of this application provide a computer storage medium, configured to store a computer software instruction used by the foregoing terminal device. The computer software instruction includes a program designed for executing the foregoing aspects.

According to a thirteenth aspect, this application further provides a computer program product that includes an instruction. When the computer program product runs on a computer, the computer is caused to perform the methods in the foregoing aspects.

According to a fourteenth aspect, this application provides a system on chip, and the system on chip includes a processor, configured to support a data sending device in implementing a function in the foregoing aspects, for example, generating or processing data and/or information in the foregoing methods. In a possible design, the system on chip further includes a memory, and the memory is configured to store a program instruction and data that are necessary for the data sending device. The system on chip may include a chip, or may include a chip and another discrete device.

DESCRIPTION OF EMBODIMENTS

The following describes technical solutions of this application with reference to accompanying drawings.

It should be understood that, the technical solutions of the embodiments of this application may be applied to various communications systems, such as: a Global System for Mobile Communications (GSM) system, a code-division multiple access (CDMA) system, a wideband code-division multiple access (WCDMA) system, a general packet radio service (GPRS) system, a Long-Term Evolution (LTE) system, an LTE frequency division duplex (FDD) system, an LTE time division duplex (TDD) system, a Universal Mobile Telecommunications System (UMTS), a Worldwide Interoperability for Microwave Access (WiMAX) communications system, a wireless local area network (WLAN) system, or a future fifth generation (5G) wireless communications system.

Figure 1:
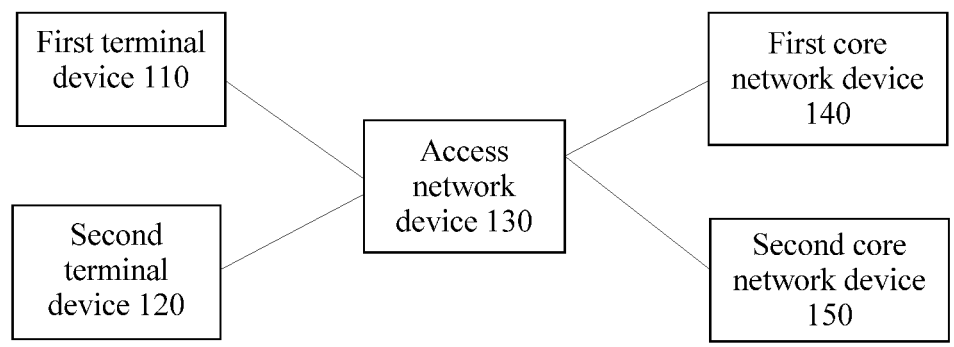
FIG. 1 is a schematic diagram of an application scenario according to an embodiment of this application.

FIG. 1 is a schematic diagram of an application scenario according to an embodiment of this application. The application scenario includes a first terminal device 110, a second terminal device 120, an access network device 130, a first core network device 140, and a second core network device 150.

The first terminal device 110 and the second terminal device 120 may each be referred to as a user equipment (UE), mobile station (MS), mobile terminal, terminal devices in a future 5G network, or the like. The terminal device may communicate with one or more core networks (such as a network slice) using a radio access network (RAN). For example, the terminal may be a mobile phone (or referred to as a "cellular" phone) or a computer having a mobile terminal. For example, alternatively, the terminal may be a portable, pocket-sized, handheld, computer built-in, or in-vehicle mobile apparatus, which exchanges voice and/or data with the radio access network. For example, in this embodiment of this application, the first terminal device 110 and the second terminal device 120 may be terminal devices having different service types or different service requirements.

The access network device 130 may be a base station controller (BSC) in GSM or CDMA, may be a radio node controller (RNC) in WCDMA, may be an evolved NodeB (eNB or e-NodeB) in LTE, or may be a new type of base station (for example, an evolved LTE NodeB (eLTE NB), or a next generation NodeB (gNB)) in a future 5G network. The access network device 130 may be a shared access network device, for example, may be an access network device shared by a plurality of public land mobile networks (PLMN).

For example, the first core network device 140 and the second core network device 150 may be core network access and mobility management function (AMF) devices, mobility management entities (MMEs), policy control function (PCF) devices, or home subscriber servers (HSS), which may be also referred to as subscription databases or serving general packet radio service (GPRS) support nodes (SGSNs). The first core network device 140 may be a core network device that serves the first terminal device 110 having a first communication feature. The second core network device 150 may be a core network device that serves the second terminal device 120 having a second communication feature.

It should be noted that, in this embodiment of this application, the first terminal device 110 and the second terminal device 120 may be terminal devices having a machine type communication feature, a vehicle type communication feature, or a public safety type communication feature, or the first core network device 140 and the second core network device 150 may have a function of serving a terminal device that has a machine type communication feature, a vehicle type communication feature, or a public safety type communication feature. For example, if the first terminal device 110 has a machine type communication feature, a core network device serving the first terminal device 110 is the first core network device 140 having a capability of serving a machine type terminal device. If the second terminal device 120 has a vehicle type communication feature, a core network device serving the terminal device 120 is the second core network device 150 having a capability of serving a vehicle type terminal device. In this embodiment, a communication feature of a terminal device may change. In a possible case, the terminal device supports a plurality of communication features, for example, has both a machine type communication feature and a mobile broadband type communication feature. The terminal device may switch among a plurality of communication features based on user settings.

For example, in a possible application scenario, when a communication feature of the first terminal device 110 changes, network slice selection assistance information (NS-SAI) corresponding to a PLMN accessed by the first terminal device 110 is also updated. The network slice selection assistance information corresponding to the PLMN is used to assist in selecting a network slice serving the first terminal device 110 in the PLMN, or assist in selecting a core network device serving the first terminal device 110 in the PLMN. The first core network device 140 notifies the first terminal device 110 of network slice selection assistance information in a currently accessed PLMN. However, when the communication feature of the first terminal device 110 changes, in addition to the network slice selection assistance information corresponding to the PLMN currently accessed by the first terminal device 110, network slice selection assistance information in another PLMN such as a roaming PLMN that may be accessed by the first terminal device 110 later may also be updated. If the first terminal device 110 is notified of only the network slice selection assistance information corresponding to the currently accessed PLMN, when the first terminal device 110 moves to the other PLMN such as the roaming PLMN, non-updated network slice selection assistance information corresponding to the roaming PLMN is incorrectly provided, and a core network device or a network slice in the roaming PLMN cannot be correctly selected for the first terminal device 110 based on the network slice selection assistance information, resulting in a redirection process.

In a possible application scenario, the network slice selection assistance information may be used to determine a core network device. For example, the network slice selection assistance information may include slice type information. Optionally, the network slice selection assistance information may further include slice differentiator information, and the slice differentiator information is used to differentiate between a plurality of network slices that are of a same slice type but serve different terminal device groups. The slice type information and the slice differentiator information may be used to determine a core network device.

In another possible application scenario, the network slice selection assistance information may be core network device type information or core network device identifier information, and the core network device type information or the core network device identifier information may be used to determine a core network device.

For another example, in a possible application scenario, the access network device 130 may broadcast shared identifier information of at least one public land mobile network (PLMN) to the first terminal device 110 and the second terminal device 120. When the first terminal device 110 and the second terminal device 120 are terminal devices supporting network sharing, the first terminal device 110 and the second terminal device 120 each determine, based on the identifier information of the at least one PLMN, a PLMN accessed by the first terminal device 110 or the second terminal device 120. Then, the first terminal device 110 and the second terminal device 120 each determine, based on a correspondence between PLMN identifier information and a core network device that is stored in the first terminal device 110 or the second terminal device 120, a core network device that the first terminal device 110 or the second terminal device 120 needs to access. Finally, the first terminal device 110 and the second terminal device 120 each add, to a request message to be sent to the access network device 130, identifier information of the core network device corresponding to the first terminal device 110 or the second terminal device 120. In this way, the access device 130 may send, based on identifier information of a core network device that is sent by each terminal device, an access request message to the core network device corresponding to each terminal device.

For still another example, in a possible application scenario, when the first terminal device 110 does not support network sharing, and the access network device 130 broadcasts identifier information of at least one PLMN, the first terminal device 110 finds, from the identifier information of the at least one PLMN, a common PLMN as a PLMN of the first terminal device 110, and then determines, based on a correspondence stored in the first terminal device 110 that is between common PLMN identifier information and network slice selection assistance information, network slice selection assistance information corresponding to the common PLMN. The terminal device 110 provides the network slice selection assistance information for the access network device 130. If the access network device 130 selects the first core network device 140 based on the network slice selection assistance information, and the first core network device 140 belongs to a first PLMN, the access network device 130 sends, to the first core network device 140, an access request sent by the first terminal device 110. When receiving the request message sent by the first terminal device 110, the first core network device 140 determines whether the first core network device 140 meets a communication feature of the first terminal device 110. When the first core network device 140 does not meet the communication feature of the first terminal device 110, the first core network device 140 determines the second core network device 150 that meets the communication feature of the first terminal device 110, and the first core network device 140 redirects the request message of the first terminal device 110 to the second core network device 150. The second core network device 150 processes the request message of the first terminal device 110. In a processing process, the second core network device 150 updates the network slice selection assistance information of the first terminal device 110, and the network slice selection assistance information corresponds to the communication feature of the terminal device. The second core network device 150 sends updated network slice selection assistance information to the first terminal device 110. After receiving the updated network slice selection assistance information, the first terminal device 110 stores identifier information of the common PLMN and the updated network slice selection assistance information. A PLMN to which the terminal device 110 actually belongs is the first PLMN, but because the first terminal device 110 does not support network sharing, the PLMN determined by the first terminal device 110 is the common PLMN. When the first terminal device 110 moves to an area covered by the first PLMN, the first terminal device 110 receives identifier information of the first PLMN that is broadcast by an access network device of the first PLMN, and the first terminal device 110 searches for corresponding network slice selection assistance information based on the identifier information of the first PLMN that is stored in the first terminal device 110. The network slice selection assistance information is not updated, and therefore, the first terminal device 110 still accesses the first core network device 140. In other words, when a core network device serving the terminal device 110 is changed from the first core network device 140 to the second core network device 150, the first terminal device 110 still accesses the first core network device 140 based on the identifier information of the first PLMN and the non-updated network slice selection assistance information that are stored in the first terminal device 110, resulting in a redirection problem.

It should be understood that a method in this embodiment of this application may be applied to a scenario in which the terminal device supports network sharing, but the access network device may not support network sharing. Alternatively, the method in this embodiment of this application may be applied to a scenario in which the terminal device does not support network sharing, but the access network device supports network sharing. Certainly, an application scenario is not limited in this embodiment of this application. For example, the method may be applied to a relationship list establishment scenario, and the terminal device and the core network device establish a relationship list between PLMN identifier information and core network device identifier information using the method in this embodiment of this application. Alternatively, the method may be applied to a relationship list update scenario. There is no limitation on the application scenario of the method in this embodiment of this application.

Figure 2:
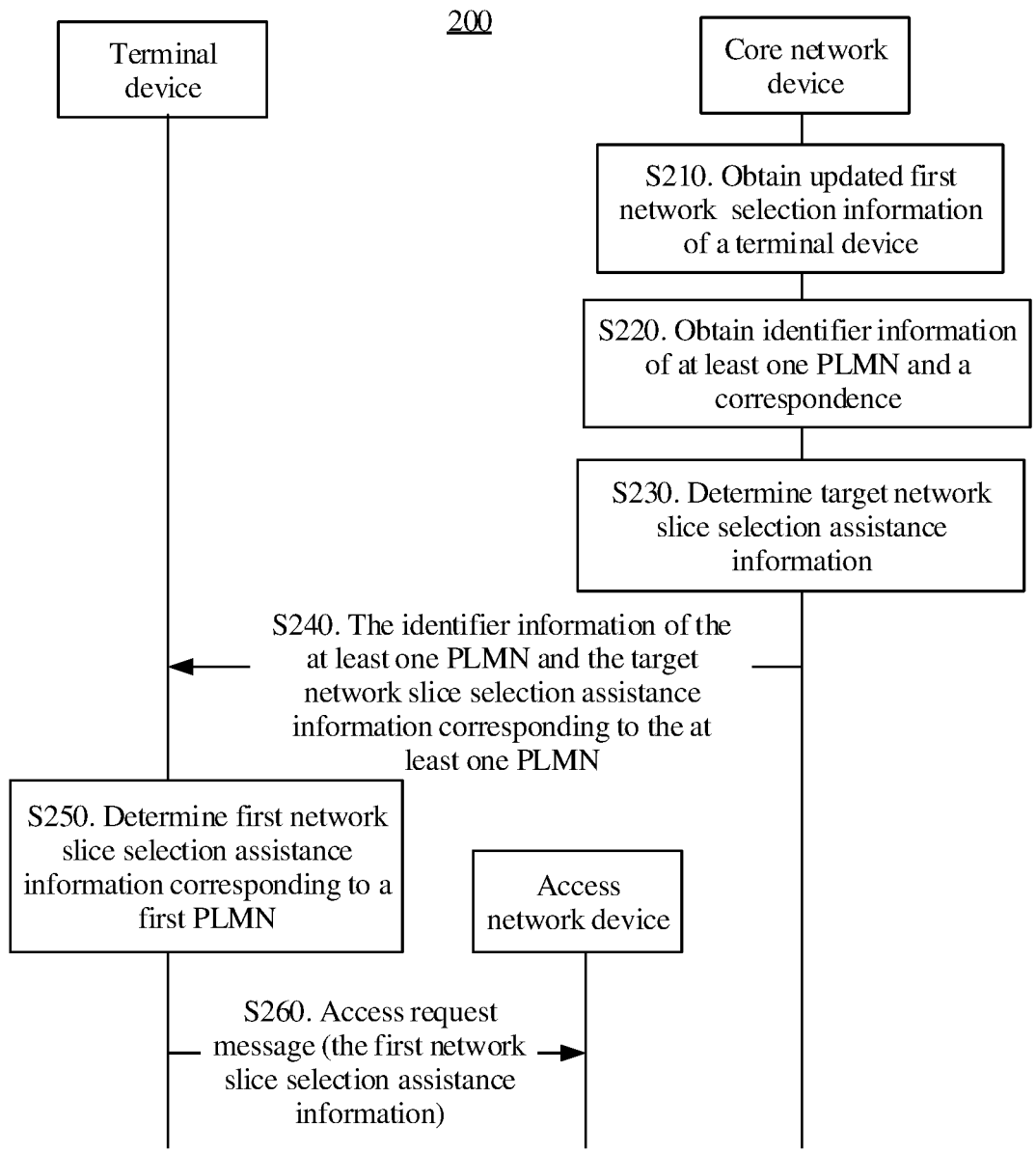
FIG. 2 is a schematic diagram of an information transmission method according to an embodiment of this application.

FIG. 2 shows an information transmission method according to an embodiment of this application. The method includes the following steps.

S210. A core network device obtains updated first network selection information of a terminal device.

Network selection information may be communication feature (for example, usage type) information of the terminal device or communication capability information of the terminal device. For example, a usage type of the terminal device may be machine type communication, mobile broadband type communication, or vehicle type communication. For another example, the terminal device has a machine communication capability, a mobile broadband communication capability, a vehicle communication capability, or the like. For example, if the terminal device is updated from an old type to a new type, information about the new type is referred to as the updated first network selection information. Certainly, in this embodiment of this application, if a core network device serving the terminal device is changed, the network selection information may be an identifier or a type of a new core network device that replaces the previous core network device. Optionally, the network selection information may also include network slice selection assistance information. In this embodiment of this application, there is no limitation on the network selection information, and any information that can cause a change of the core network device accessed by the terminal device may be referred to as the network selection information.

S220. The core network device obtains identifier information of at least one PLMN, and a correspondence between network slice selection assistance information and network selection information in the at least one PLMN, where the network selection information in the at least one PLMN includes the updated first network selection information.

In an optional embodiment, the at least one PLMN includes a PLMN currently accessed by the terminal device, or includes a PLMN alternatively accessed by the terminal device, or includes a PLMN currently accessed by the terminal device and a PLMN alternatively accessed by the terminal device. The alternatively accessed PLMN may be a PLMN that may be accessed by the terminal device later, for example, a PLMN accessed by the terminal device in a roaming area.

It should be noted that, for content of the network selection information in the at least one PLMN, refer to the description of the network selection information in step 210. The network selection information in the PLMN includes the updated first network selection information.

It should also be noted that the network slice selection assistance information in the at least one PLMN may be slice type information in the at least one PLMN, and the slice type information may be used to determine a core network device. Optionally, the network slice selection assistance information may further include slice differentiator information, and the slice differentiator information is used to differentiate between a plurality of network slices that are of a same slice type but serve different terminal device groups. The slice type information and the slice differentiator information may be used to determine a core network device. Optionally, the network slice selection assistance information may be core network device type information or core network device identifier information, and the core network device type information or the core network device identifier information may be used to determine a core network device. For example, the network slice selection assistance information may be stored in a subscription database. Alternatively, the core network device may determine the network slice selection assistance information for the terminal device based on the updated first network selection information of the terminal device. For example, when the current core network device does not support a service requirement of the terminal device, the current core network device may determine a target core network device that can provide a required service for the terminal device. A type or an identifier of the target core network device may be referred to as the network slice selection assistance information.

S230. The core network device determines, based on the updated first network selection information and the correspondence, target network slice selection assistance information corresponding to the at least one PLMN.

For example, the correspondence is used to represent a relationship between the network selection information and the network slice selection assistance information. A change of the network selection information causes a change of the network slice selection assistance information. Therefore, the core network device may determine, as the target network slice selection assistance information based on the updated first network selection information and the correspondence, network slice selection assistance information corresponding to the updated first network selection information. There may be one piece of target network slice selection assistance information in one PLMN, and there may be two pieces of target network slice selection assistance information in two PLMNs. In other words, one PLMN may correspond to one piece of network slice selection assistance information. Certainly, this embodiment of this application is not limited thereto. For example, two PLMNs may correspond to one piece of network slice selection assistance information. Alternatively, one PLMN may correspond to two pieces of network slice selection assistance information. To be more specific, there may be one or more core network devices serving the terminal device. When first network selection information of the terminal device is updated, one or more pieces of network slice selection assistance information may be used to assist the terminal device in accessing one or more core network devices.

S240. The core network device sends, to the terminal device, the identifier information of the at least one PLMN and the target network slice selection assistance information corresponding to the at least one PLMN. The terminal device receives the identifier information of the at least one PLMN and the target network slice selection assistance information corresponding to the at least one PLMN that are sent by the core network device, where the identifier information of the at least one PLMN and the target network slice selection assistance information corresponding to the at least one PLMN include identifier information of a first PLMN and first network selection assistance information corresponding to the first PLMN.

In an optional embodiment, after S240, the method 200 further includes sending, by the core network device, first indication information to the terminal device, where the first indication information is used to instruct the terminal device to store the identifier information of the at least one PLMN and the target network slice selection assistance information corresponding to the at least one PLMN. The terminal device receives the first indication information sent by the core network device, and stores, according to the first indication information, the identifier information of the at least one PLMN and the target network slice selection assistance information corresponding to the at least one PLMN.

This embodiment of this application may be applied to a scenario in which the terminal device is in a data-connected state or an idle state. The following separately describes different application scenarios. The following description uses an example in which the core network device is an AMF device.

When the terminal device is in an idle state, the terminal device sends a non-access stratum request message to the AMF device, and S230 includes: when the AMF device receives the non-access stratum request message sent by the terminal device, determining, by the AMF device based on the updated first network selection information and the correspondence, the target network slice selection assistance information corresponding to the at least one PLMN. There is no sequence between a step of determining the target network slice selection assistance information corresponding to the at least one PLMN and a step of receiving the non-access stratum request message. S240 includes: sending, by the AMF device to the terminal device using a non-access stratum message (such as a response message of the non-access stratum request message), an identifier of the at least one PLMN and the target network slice selection assistance information corresponding to the at least one PLMN, and receiving, by the terminal device using the non-access stratum message, the identifier information of the at least one PLMN and the target network slice selection assistance information corresponding to the at least one PLMN that are sent by the AMF device. Optionally, the non-access stratum message includes the first indication information, and the first indication information is used to indicate that the terminal device needs to update or store the identifier information of the at least one PLMN and the target network slice selection assistance information corresponding to the at least one PLMN.

When the terminal device is in a data-connected state, after the AMF device determines the target network slice selection assistance information corresponding to the at least one PLMN, the AMF device may add, to a non-access stratum message, the identifier information of the at least one PLMN and the target network slice selection assistance information corresponding to the at least one PLMN, and send the non-access stratum message to the terminal device. The terminal device receives the identifier information of the at least one PLMN and the network slice selection assistance information corresponding to the at least one PLMN that are sent by the AMF device using the non-access stratum message. The non-access stratum message may be temporary redistribution identifier information.

For example, the core network device may be the AMF device, a PCF device, a subscription database, or the like. The following separately provides description in three cases. However, this is not limited in this embodiment of this application.

In a first case, when the core network device is the AMF device, S210 includes: receiving, by the AMF device, the updated first network selection information of the terminal device that is sent by a subscription database; and S220 includes: receiving, by the AMF device, the correspondence between network slice selection assistance information and network selection information in the at least one PLMN, and the identifier information of the at least one PLMN that are sent by a PCF device or the subscription database. For example, when subscription information of the terminal device in the subscription database is updated, if the subscription information is first network selection information, the subscription database sends the updated first network selection information to the AMF device. Optionally, the subscription database may further store the identifier information of the at least one PLMN and the correspondence, and the subscription database sends the identifier information of the at least one PLMN and the correspondence to the AMF device. Optionally, the PCF device may store the identifier information of the at least one PLMN and the correspondence, and the PCF device sends the identifier information of the at least one PLMN and the correspondence to the AMF device. Optionally, the subscription database may store the identifier information of the at least one PLMN, and the PCF device may store the correspondence. The subscription database sends the identifier information of the at least one PLMN to the AMF device, and the PCF device sends the correspondence to the AMF device. Optionally, the AMF device may receive identifier information of the alternative PLMN that is sent by the subscription database, and the AMF device may determine identifier information of the currently accessed PLMN based on a current access status of the terminal device. Optionally, the AMF device may receive a PLMN sent by the subscription database, and determine, based on the PLMN and a first mapping relationship, the alternatively accessed PLMN and/or the currently accessed PLMN. The first mapping relationship is used to indicate a mapping relationship between the PLMN and the PLMN alternatively accessed by the terminal device and/or a mapping relationship between the PLMN and the PLMN currently accessed by the terminal device. How the AMF device obtains the identifier information of the at least one PLMN and the correspondence is not limited in this embodiment of this application. For example, the subscription database or the PCF device may send the identifier information of the at least one PLMN and/or the correspondence to the AMF device based on a request from the AMF device. Alternatively, when the first network selection information of the terminal device in the subscription database is updated, the subscription database may send the identifier information of the at least one PLMN and the correspondence to the AMF device. This is not limited in this embodiment of this application.

In a possible implementation, the correspondence may not be sent by the PCF device or the subscription database to the AMF device, but stored in the AMF device.

In a second case, when the core network device is the PCF device, the PCF device stores a roaming agreement, and the roaming agreement stores the PLMN alternatively accessed by the terminal device. S210 includes: receiving, by the PCF device, the updated first network selection information of the terminal device that is sent by a subscription database using an AMF device. S220 includes: obtaining, by the PCF device, the identifier information of the at least one PLMN based on a PLMN to which the PCF device belongs and the roaming agreement, and obtaining, by the PCF device, the correspondence stored in the PCF device. S240 includes: sending, by the PCF device to the terminal device using the AMF device, the identifier information of the at least one PLMN and the target network slice selection assistance information corresponding to the at least one PLMN. In other words, the PCF device may store the correspondence, the PLMN to which the PCF device belongs is the PLMN currently accessed by the terminal device, and the PLMN in the roaming agreement may be the alternative PLMN. Optionally, the PCF device may receive the identifier information of the at least one PLMN or the correspondence that is sent by subscription data using the AMF device. Optionally, the PCF device may directly receive the updated first network selection information of the terminal device that is sent by the AMF device.

In a third case, when the core network device is the subscription database, S210 includes: obtaining, by the subscription database, the updated first network selection information of the terminal device that is stored in the subscription database; S220 includes: receiving, by the subscription database, the correspondence and a roaming agreement that are sent by a PCF device, where the roaming agreement includes the identifier information of the at least one PLMN, and the PCF device stores the correspondence and the roaming agreement; and S240 includes: sending, by the subscription database to the terminal device using an AMF device, the identifier information of the at least one PLMN and the target network slice selection assistance information corresponding to the at least one PLMN.

S250. The terminal device obtains the identifier information of the first PLMN, and determines the first network selection assistance information based on the identifier information of the first PLMN.

For example, the terminal device searches, based on the identifier information of the first PLMN, for network slice selection assistance information corresponding to the first PLMN in the correspondence, namely, the first network selection assistance information. Optionally, the first network selection assistance information may be the foregoing target network slice selection assistance information.

S260. The terminal device initiates an access request, where an access request message carries the first network selection assistance information. For example, as shown in FIG. 2, the terminal device may initiate accessing to an access network device. Certainly, the terminal device may also initiate accessing to a target core network device represented by the first network selection assistance information. This is not limited in this embodiment of this application.

In this embodiment of this application, after the terminal device receives the identifier information of the at least one PLMN and the target network slice selection assistance information corresponding to the at least one PLMN that are sent by the core network device, when the terminal device does not have the identifier information of the at least one PLMN and the target network slice selection assistance information corresponding to the at least one PLMN, the terminal device stores the identifier information of the at least one PLMN and the target network slice selection assistance information corresponding to the at least one PLMN. In another implementation, after the terminal device receives the identifier information of the at least one PLMN and the target network slice selection assistance information corresponding to the at least one PLMN that are sent by the core network device, when the terminal device has stored the identifier information of the at least one PLMN and network slice selection assistance information corresponding to the at least one PLMN, the terminal device may update, to the target network slice selection assistance information, the network slice selection assistance information corresponding to the at least one PLMN. When the terminal device accesses the first PLMN in the at least one PLMN, the terminal device determines, based on the identifier information of the first PLMN and the correspondence, the first network selection assistance information corresponding to the first PLMN. The terminal device may access the corresponding target core network device based on the first network selection assistance information corresponding to the first PLMN. For example, the target network slice selection assistance information corresponding to the first PLMN is identifier information of a first core network device. The terminal device initiates accessing to the first core network device, and an access request message carries the identifier information of the first core network device. Alternatively, the terminal device initiates accessing to the access network device, and an access request message carries the identifier information of the first core network device. When the access network device receives the identifier information of the first core network device that is sent by the terminal device, the access network device determines the first core network device as the target core network device of the terminal device, and initiates accessing to the target core network device. For example, the target core network device may be the AMF device.

In an optional embodiment, when the first PLMN is the alternatively accessed PLMN, the terminal device obtains the identifier information of the first PLMN when accessing the first PLMN.

In an optional embodiment, when the first PLMN is the currently accessed PLMN, the terminal device obtains the identifier information of the first PLMN when the terminal device previously accesses the first PLMN.

In other words, in this embodiment of this application, the terminal device stores a correspondence between PLMN identifier information and network slice selection assistance information. When the terminal device accesses the alternative first PLMN, the core network device sends the identifier information of the alternative first PLMN to the terminal device, and the terminal device determines the first network selection assistance information based on the identifier information of the alternative first PLMN, in order to add the first network selection assistance information to the access request message when accessing is initiated. When a PLMN accessed by the terminal device is the currently accessed first PLMN, the terminal device obtains the identifier information of the first PLMN that is obtained by the terminal device when the terminal device previously accesses the first PLMN, and the terminal device determines the first network selection assistance information based on the obtained identifier information of the first PLMN, in order to add the first network selection assistance information to the access request message when accessing is initiated.

To better understand the information transmission method corresponding to FIG. 2 in this embodiment of this application, the following uses an example for description. It is assumed that the at least one PLMN includes a PLMN A and a PLMN B, the PLMN A is the currently accessed PLMN, and the PLMN B is the alternatively accessed PLMN. For example, the PLMN B is a PLMN to which the terminal device may roam. Table 1 and Table 2 respectively show a correspondence between network selection information and network slice selection assistance information in the PLMN A and a correspondence between network selection information and network slice selection assistance information in the PLMN B. When a type of the terminal device changes from a mobile broadband type to a machine type communication type, that is, when the updated first network selection information of the terminal device changes to a machine type communication type, the core network device determines that the network slice selection assistance information corresponding to the PLMN A needs to change from A1 to A2, and the network slice selection assistance information corresponding to the PLMN B needs to change from B1 to B2. Then, A2 is target network slice selection assistance information in the PLMN A, and B2 is target network slice selection assistance information in the PLMN B. The core network device needs to send identifier information of the PLMN A, the network slice selection assistance information A2, identifier information of the PLMN B, and the network slice selection assistance information B2 to the terminal device. The terminal device stores the identifier information of the PLMN A, the network slice selection assistance information A2, the identifier information of the PLMN B, and the network slice selection assistance information B2. If network slice selection assistance information originally stored in the terminal device is shown in Table 3, network slice selection assistance information in the PLMN A in Table 3 is A1, and network slice selection assistance information in the PLMN B in Table 3 is B1, when the updated first network selection information of the terminal device is a machine communication type, the terminal device needs to update a table stored in the terminal device, that is, update Table 3 to Table 4. To be more specific, network slice selection assistance information corresponding to the PLMN A is A2, and network slice selection assistance information corresponding to the PLMN B is B2. Optionally, A2 and B2 may be the same or different. For example, Table 1 and Table 2 may be referred to as the foregoing correspondence between network slice selection assistance information and network selection information in the at least one PLMN.

TABLE 1

| PLMN A | |
| --- | --- |
| network selection information | Network slice selection assistance information |
| Mobile broadband type | Network slice selection assistance information A1 |
| Machine type communication type | Network slice selection assistance information A2 |
| Vehicle type communication type | Network slice selection assistance information A3 |
| ... | ... |

TABLE 2

| PLMN B | |
| --- | --- |
| network selection information | Network slice selection assistance information |
| Mobile broadband type | Network slice selection assistance information B1 |
| Machine type communication type | Network slice selection assistance information B2 |
| Vehicle type communication type | Network slice selection assistance information B3 |
| ... | ... |

TABLE 3

| PLMN | Network slice selection assistance information |
|---|---|
| PLMN A | network slice selection assistance information A1 |
| PLMN B | network slice selection assistance information B1 |

TABLE 4

| PLMN | Network slice selection assistance information |
|---|---|
| PLMN A | network slice selection assistance information A2 |
| PLMN B | network slice selection assistance information B2 |

Figure 3:
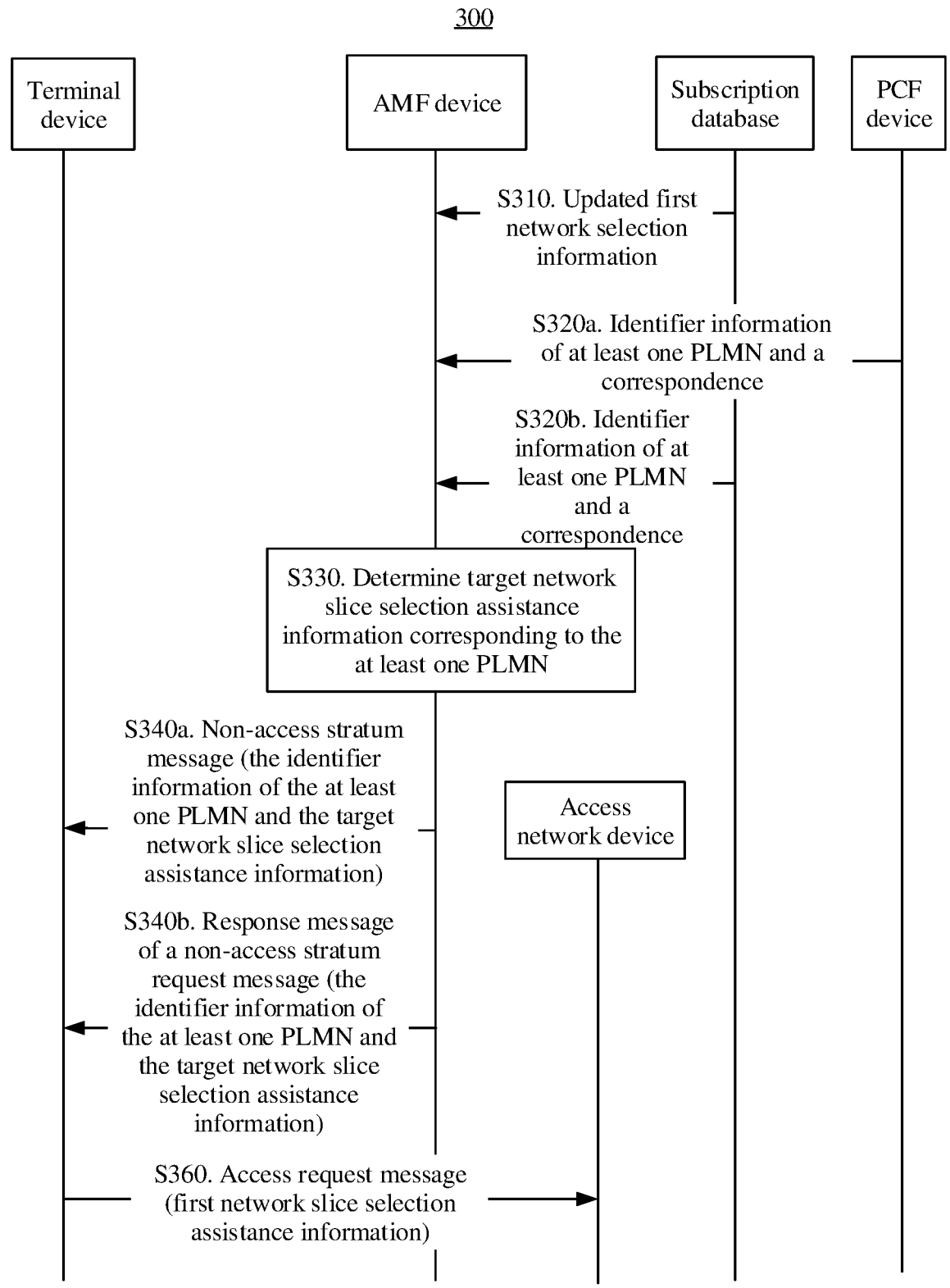
FIG. 3 is a schematic diagram of another information transmission method according to an embodiment of this application.

Based on the embodiment in FIG. 2, in an example, as shown in FIG. 3, the following describes an information transmission method 300 according to an embodiment of this application. The method 300 includes the following steps.

S310. A subscription database sends updated first network selection information to an AMF device, and the AMF device receives the updated first network selection information (for example, a machine type communication type) sent by the subscription database.

S320a. A PCF device sends identifier information of at least one PLMN and a correspondence (for example, the foregoing Table 1 and Table 2 between network slice selection assistance information and network selection information in the at least one PLMN to the AMF device, and the AMF device receives the identifier information of the at least one PLMN and the correspondence that are sent by the PCF device.

S320b. The subscription database sends identifier information of at least one PLMN and a correspondence (for example, the foregoing Table 1 and Table 2) between network slice selection assistance information and network selection information in the at least one PLMN to the AMF device, and the AMF device receives the identifier information of the at least one PLMN and the correspondence that are sent by the subscription database.

It should be understood that, there may be only S320a or S320b, or there may be both S320a and S320b. In addition, a sequence between S310 and S320a or S320b is not limited. For example, S310 may be performed before S320a or S320b, or may be performed after S320a or S320b.

Optionally, S310 may be that a change of subscription information of the terminal device in the subscription database causes an update of first network selection information of the terminal device, and the subscription database actively sends the updated first network selection information to the AMF device periodically. Alternatively, the subscription database may send the updated first network selection information based on a request from the AMF device. Similarly, S320a or S320b may be that the subscription database or the PCF device sends the identifier information of the at least one PLMN and the correspondence based on a request from the AMF device. Alternatively, S320a or S320b may be that the subscription database or the PCF device actively sends the identifier information of the at least one PLMN and the correspondence. For example, the subscription database or the PCF device may periodically send the identifier information of the at least one PLMN and the correspondence to the AMF device. This is not limited in this embodiment of this application.

Optionally, the subscription database may send the identifier information of the at least one PLMN to the AMF device, and the PCF device sends the correspondence to the AMF device. This is not limited in this embodiment of this application.

S330. The AMF device determines, based on the updated first network selection information and the correspondence, target network slice selection assistance information corresponding to the at least one PLMN (for example, target network slice selection assistance information corresponding to a PLMN A is A2, and target network slice selection assistance information corresponding to a PLMN B is B2).

S340a or S340b is performed subsequently. For example, if the updated first network selection information is the machine type communication type, the correspondence is Table 1 or Table 2, and the at least one PLMN includes the PLMN A and the PLMN B in Table 1 and Table 2, the target network slice selection assistance information corresponding to the at least one PLMN in Table 1 and Table 2 is A2 and B2.

S340a. When the terminal device is in a data-connected state, the AMF device sends, to the terminal device using a non-access stratum message, the identifier information of the at least one PLMN and the target network slice selection assistance information corresponding to the at least one PLMN. For example, the non-access stratum message may be temporary identifier redistribution information.

S340b. When the terminal device is in an idle state, the AMF device may send, to the terminal device using a response message of a non-access request message, the identifier information of the at least one PLMN and the target network slice selection assistance information corresponding to the at least one PLMN. For example, the AMF device may send the response message of the non-access stratum request message to the terminal device using an access network device. The response message of the non-access stratum request message carries the identifier information of the at least one PLMN and the target network slice selection assistance information corresponding to the at least one PLMN. Optionally, the response message of the non-access request message may carry indication information. The indication information indicates that the current AMF device cannot serve the terminal device, and the terminal device needs to update or store the identifier information of the at least one PLMN and the target network slice selection assistance information corresponding to the at least one PLMN.

S350. After receiving the non-access stratum message or the response message of the non-access stratum request message, the terminal device may update or store the identifier information of the at least one PLMN and the target network slice selection assistance information corresponding to the at least one PLMN. In addition, the terminal device may obtain identifier information of a first PLMN in the at least one PLMN, and determine first network selection assistance information corresponding to the first PLMN.

For example, if the first PLMN is an alternative PLMN, when the terminal device accesses the first PLMN, the access network device sends the identifier information of the first PLMN to the terminal device, and the terminal device determines the network slice selection assistance information in the first PLMN based on network selection information of the terminal device. When the first PLMN is a PLMN currently accessed by the terminal device, the terminal device may previously access the currently accessed PLMN.

Therefore, identifier information of the currently accessed PLMN may be determined based on the previously accessed PLMN, and then the network slice selection assistance information is determined based on the identifier information of the PLMN. For example, it is assumed that the identifier information of the PLMN is PLMN A. As shown in Table 1, if the terminal device is of a machine type currently, the terminal device may determine, based on the communication type of the terminal device, that the network slice selection assistance information is A2.

Optionally, the first network selection assistance information may be target network slice selection assistance information in the first PLMN.

S360. The terminal device sends an access request message to an access network device, where the access request message carries the first network selection assistance information corresponding to the first PLMN. Alternatively, the terminal device may directly initiate accessing to a target AMF device corresponding to the first network selection assistance information.

For example, when the terminal device moves to an area covered by the first PLMN, the terminal device determines, based on a correspondence stored in the terminal device that is between PLMN identifier information and network slice selection assistance information, the first network selection assistance information corresponding to the first PLMN. The first network selection assistance information is used to assist the terminal device in accessing the target AMF device. The terminal device may access the target AMF device in two manners. In a first manner, the terminal device sends the access request message to the access network device, and the access request message carries the first network selection assistance information corresponding to the first PLMN. The access network device determines the target AMF device based on the first network selection assistance information, initiates a request to the target AMF device, and requests that the terminal device need to access the target AMF device. In a second manner, the terminal device directly determines the target AMF device based on the first network selection assistance information, and directly initiates accessing to the target AMF device.

Therefore, according to the information transmission method provided in this embodiment of this application, the AMF device sends, to the terminal device, the identifier information of the at least one PLMN and the target network slice selection assistance information corresponding to the at least one PLMN. When the terminal device stores the identifier information of the at least one PLMN and the network slice selection assistance information corresponding to the at least one PLMN, the terminal device updates the stored network slice selection assistance information corresponding to the at least one PLMN. When the terminal device does not store the identifier information of the at least one PLMN and the target network slice selection assistance information corresponding to the at least one PLMN, the terminal device stores the identifier information of the at least one PLMN and the target network slice selection assistance information corresponding to the at least one PLMN. In this way, the network slice selection assistance information corresponding to the identifier information of the at least one PLMN can be updated or stored in real time. When accessing any of the at least one PLMN, the terminal device can find the corresponding network slice selection assistance information, such that it can be ensured that the terminal device correctly accesses the network.

Figure 4:
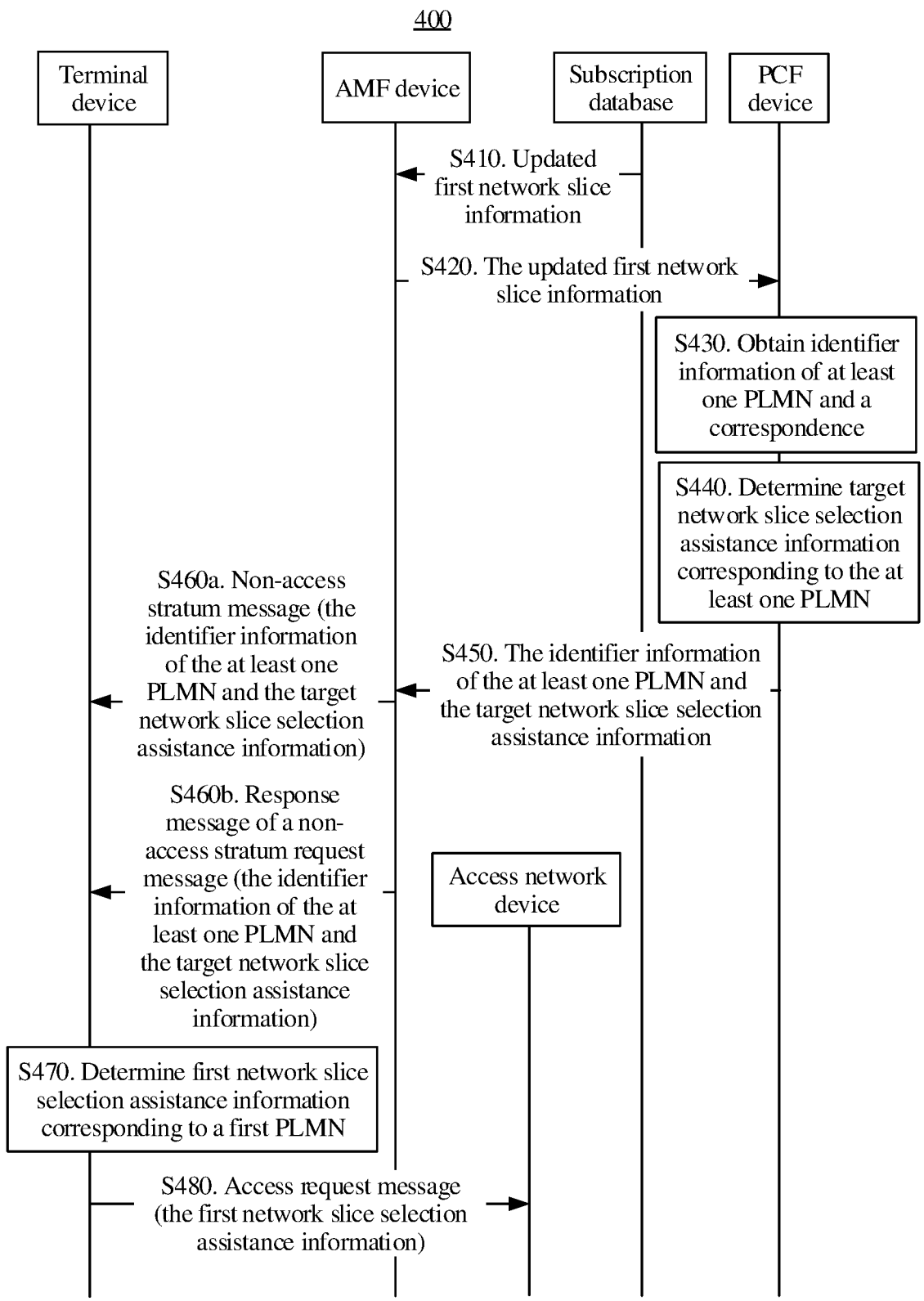
FIG. 4 is a schematic diagram of still another information transmission method according to an embodiment of this application.

Based on the embodiment in FIG. 2, in another example, as shown in FIG. 4, the following describes an information transmission method 400 according to an embodiment of this application. The method 400 includes the following steps.

S410. When subscription information of a terminal device in a subscription database changes, for example, when first network selection information of the terminal device is updated, the subscription database sends updated first network selection information (for example, a machine type communication type) to an AMF device.

Optionally, the change of the subscription information of the terminal device in the subscription database causes the update of the first network selection information of the terminal device. The subscription database actively sends the updated first network selection information to the AMF device periodically. Alternatively, the subscription database may send the updated first network selection information based on a request from the AMF device.

S420. The AMF device sends the updated first network selection information to a PCF device. For example, when the AMF device receives the updated first network selection information sent by the subscription database, the AMF device sends the updated first network selection information to the PCF device. Alternatively, the AMF device stores the updated first network selection information when receiving the updated first network selection information. Then the AMF device sends the updated first network selection information to the PCF device when the PCF device requests network selection information from the AMF device.

Optionally, step S410 may not be performed, that is, the AMF device originally stores the updated first network selection information of the terminal device. In this way, the AMF device may directly send the updated first network selection information to the PCF device.

S430. The PCF device may store a correspondence (for example, the foregoing Table 1 and Table 2) between network slice selection assistance information and network selection information in at least one PLMN. In this way, the PCF device may obtain the correspondence stored in the PCF device. The PCF device may determine, based on identifier information of a PLMN to which the PCF device belongs, identifier information of a PLMN currently accessed by the terminal device. The PCF device may determine identifier information of an alternatively accessed PLMN based on roaming stored in the PCF device. In this way, identifier information of the at least one PLMN and the correspondence can be obtained.

S440. The PCF device determines, based on the updated first network selection information and the correspondence, target network slice selection assistance information corresponding to the at least one PLMN (for example, target network slice selection assistance information corresponding to a PLMN A is A2, and target network slice selection assistance information corresponding to a PLMN B is B2). S340a or S340b is performed subsequently. For example, if the updated first network selection information is the machine type communication type, the correspondence is Table 1 or Table 2, and the at least one PLMN includes the PLMN A and the PLMN B in Table 1 and Table 2, the target network slice selection assistance information corresponding to the at least one PLMN in Table 1 and Table 2 is A2 and B2.

S450. The PCF device sends, to the AMF device, the identifier information of the at least one PLMN and the target network slice selection assistance information corresponding to the at least one PLMN. Then the AMF device receives the identifier information of the at least one PLMN and the target network slice selection assistance information corresponding to the at least one PLMN that are sent by the PCF device.

S460*a* is the same as S340*a*.
S460*b* is the same as S340*b*.
S470 is the same as S350.
S480 is the same as S360.

Figure 5:
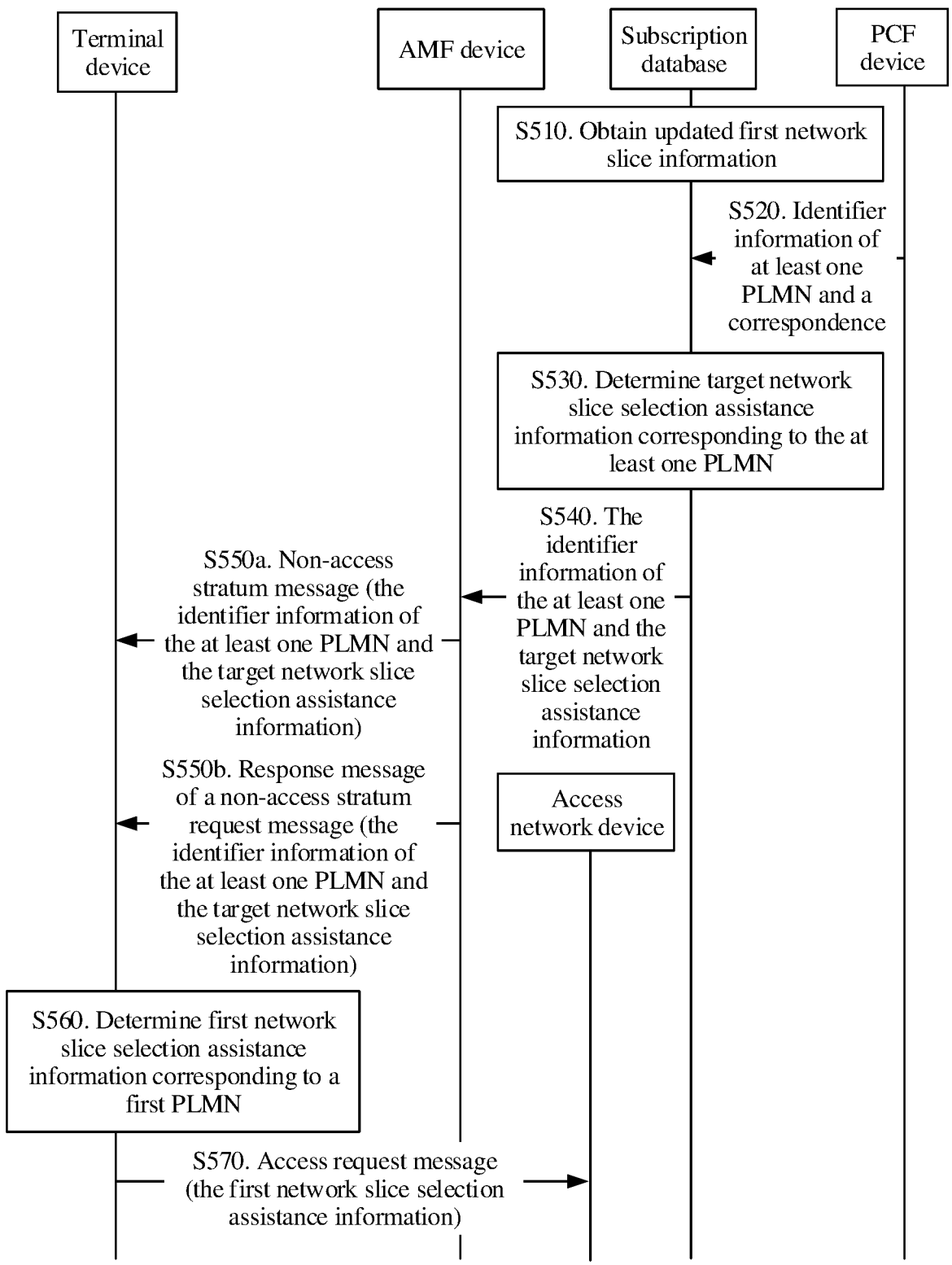
FIG. 5 is a schematic diagram of still another information transmission method according to an embodiment of this application.

Based on the embodiment in FIG. 2, in another example, as shown in FIG. 5, the following describes an information transmission method 500 according to an embodiment of this application. The method 500 includes the following steps.

S510. The subscription database obtains updated first network selection information (for example, a machine type communication type) of the terminal device that is stored in the subscription database.

S520. The PCF device sends, to the subscription database, identifier information of at least one PLMN and a correspondence (for example, the foregoing Table 1 and Table 2) between network slice selection assistance information and network selection information in the at least one PLMN.

It should be understood that the PCF device may send the identifier information of the at least one PLMN and the correspondence to the subscription database based on a request from the subscription database. Alternatively, the PCF device actively sends the identifier information of the at least one PLMN and the correspondence to the subscription database.

Optionally, the subscription database may store the correspondence. This is not limited in this embodiment of this application.

S530. The subscription database determines, based on the updated first network selection information and the correspondence, target network slice selection assistance information corresponding to the at least one PLMN (for example, target network slice selection assistance information corresponding to a PLMN A is A2, and target network slice selection assistance information corresponding to a PLMN B is B2). For example, if the updated first network selection information is the machine type communication type, the correspondence is Table 1 or Table 2, and the at least one PLMN includes the PLMN A and the PLMN B in Table 1 and Table 2, the target network slice selection assistance information corresponding to the at least one PLMN in Table 1 and Table 2 is A2 and B2.

S540. The subscription database sends, to an AMF device, the identifier information of the at least one PLMN and the target network slice selection assistance information corresponding to the at least one PLMN, and the AMF device receives the identifier information of the at least one PLMN and the target network slice selection assistance information corresponding to the at least one PLMN that are sent by the subscription database.

S550*a* is the same as S340*a*.
S550*b* is the same as S340*b*.
S560 is the same as S350.
S570 is the same as S360.

It should be understood that the core network device in the method 200 to the method 500 may be the first core network device 140 or the second core network device 150, and the terminal device in the method 200 to the method 500 may be the first terminal device 110 or the second terminal device 120.

The information transmission method according to the embodiments of this application is described above in detail with reference to FIG. 2 to FIG. 5. The following describes an information transmission apparatus and system according to the embodiments of this application with reference to FIG. 6 to FIG. 10.

Figure 6:
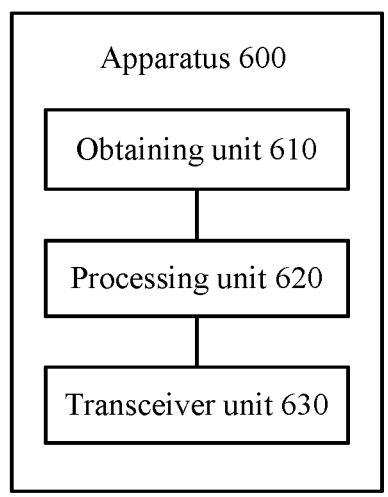
FIG. 6 is a schematic diagram of an information transmission apparatus according to an embodiment of this application.

FIG. 6 is a schematic block diagram of an information transmission apparatus 600 according to an embodiment of this application. The apparatus may be the core network device in the method 200 to the method 500. As shown in FIG. 6, the apparatus 600 includes an obtaining unit 610, a processing unit 620, and a transceiver unit 630.

The obtaining unit 610 is configured to obtain updated first network selection information of a terminal device.

The obtaining unit 610 is further configured to obtain identifier information of at least one PLMN, and a correspondence between network slice selection assistance information and network selection information in the at least one PLMN. The network selection information in the at least one PLMN includes the updated first network selection information.

The processing unit 620 is configured to determine, based on the updated first network selection information and the correspondence, target network slice selection assistance information corresponding to the at least one PLMN.

The transceiver unit 630 is configured to send, to the terminal device, the identifier information of the at least one PLMN and the target network slice selection assistance information corresponding to the at least one PLMN.

In an optional embodiment, the at least one PLMN includes a PLMN currently accessed by the terminal device and/or a PLMN alternatively accessed by the terminal device.

In an optional embodiment, the transceiver unit 630 is further configured to send first indication information to the terminal device. The first indication information is used to instruct the terminal device to store the identifier information of the at least one PLMN and the target network slice selection assistance information.

In an optional embodiment, the apparatus 600 is an access and mobility management function (AMF) device. The processing unit 620 is configured such that when receiving a non-access stratum request message sent by the terminal device, the processing unit 620 determines, based on the updated first network selection information and the correspondence, the target network slice selection assistance information corresponding to the at least one PLMN. The transceiver unit 630 is configured to send the identifier information of the at least one PLMN and the target network slice selection assistance information to the terminal device using a response message of the non-access stratum request message.

In an optional embodiment, the apparatus is the AMF device. The obtaining unit 610 is configured to: receive the updated first network selection information of the terminal device that is sent by a subscription database; receive the correspondence between network slice selection assistance information and network selection information in the at least one PLMN; and receive the identifier information of the at least one PLMN that are sent by a policy control function PCF device or the subscription database.

In an optional embodiment, the apparatus 600 is a PCF device. The obtaining unit 610 is further configured to: receive the updated first network selection information of the terminal device that is sent by a subscription database using an AMF device; obtain the identifier information of the at least one PLMN based on a PLMN to which the PCF device belongs and/or a roaming agreement; and obtain the correspondence stored in the PCF device. The transceiver unit 630 is further configured to send, to the terminal device using the AMF device, the identifier information of the at least one PLMN and the target network slice selection assistance information corresponding to the at least one PLMN.

In an optional embodiment, the apparatus 600 is a subscription database. The obtaining unit 610 is further configured to: obtain the updated first network selection information of the terminal device that is stored in the apparatus 600; and receive the correspondence and the identifier information of the at least one PLMN that are sent by a PCF device. The transceiver unit 620 is further configured to send, to the terminal device using an AMF device, the identifier information of the at least one PLMN and the target network slice selection assistance information corresponding to the at least one PLMN.

In an optional embodiment, the network slice selection assistance information in the at least one PLMN includes slice type information, identifier information of an apparatus that the terminal device currently needs to access, or type information of an apparatus that the terminal device currently needs to access.

In an optional embodiment, the network selection information in the at least one PLMN includes communication feature information of the terminal device or communication capability information of the terminal device.

It should be understood that the apparatus 600 herein is embodied in a form of functional units. The term "unit" herein may refer to an application-specific integrated circuit (ASIC), an electronic circuit, a processor (such as a shared processor, a dedicated processor, or a group processor) for executing one or more software or firmware programs, a memory, a merged logic circuit, and/or another appropriate component supporting the described functions. In an optional example, a person skilled in the art may understand that the apparatus 600 may be the core network device in the foregoing embodiments, and the apparatus 600 may be configured to perform procedures and/or steps that correspond to the core network device in the foregoing method embodiments. To avoid repetition, details are not described herein again.

Figure 7:
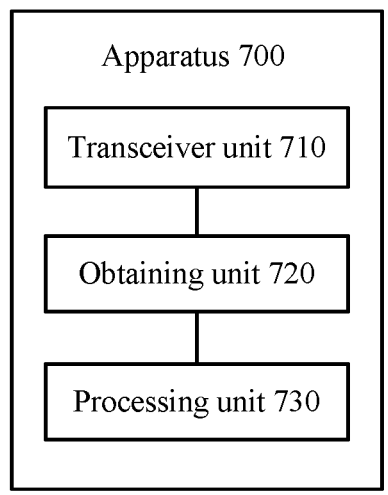
FIG. 7 is a schematic diagram of another information transmission apparatus according to an embodiment of this application.

FIG. 7 is a schematic block diagram of an information transmission apparatus 700 according to an embodiment of this application. The apparatus may be the terminal device in the method 200 to the method 500. As shown in FIG. 7, the apparatus 700 includes a transceiver unit 710, an obtaining unit 720, and a processing unit 730.

The transceiver unit 710 is configured to receive identifier information of at least one PLMN and target network slice selection assistance information corresponding to the at least one PLMN that are sent by a core network device, and the identifier information of the at least one PLMN and the target network slice selection assistance information corresponding to the at least one PLMN include identifier information of a first PLMN and first network selection assistance information corresponding to the first PLMN.

The obtaining unit 720 is configured to obtain the identifier information of the first PLMN.

The processing unit 730 is configured to determine the first network selection assistance information based on the identifier information of the first PLMN.

The transceiver unit 710 is further configured to initiate an access request, where an access request message carries the first network selection assistance information.

In an optional embodiment, the at least one PLMN includes a PLMN currently accessed by the apparatus and/or a PLMN alternatively accessed by the apparatus.

In an optional embodiment, when the first PLMN is the alternatively accessed PLMN, the obtaining unit 720 is configured to obtain the identifier information of the first PLMN that is sent by the core network device when the apparatus 700 accesses the first PLMN.

In an optional embodiment, when the first PLMN is the currently accessed PLMN, the obtaining unit 720 is further configured to obtain the identifier information of the first PLMN that is obtained by the apparatus 700 when the apparatus 700 previously accesses the first PLMN.

In an optional embodiment, the transceiver unit 710 is further configured to send a non-access stratum request message to the core network device before receiving the identifier information of the at least one PLMN and the target network slice selection assistance information corresponding to the at least one PLMN that are sent by the core network device. The transceiver unit 710 is further configured to receive, using a response message of the non-access stratum request message, the identifier information of the at least one PLMN and the target network slice selection assistance information corresponding to the at least one PLMN that are sent by the core network device.

In an optional embodiment, the transceiver unit 710 is further configured to receive first indication information sent by the core network device. The first indication information is used to instruct the apparatus to store the identifier information of the at least one PLMN and the target network slice selection assistance information corresponding to the at least one PLMN.

In an optional embodiment, the network slice selection assistance information in the at least one PLMN includes slice type information, identifier information of a core network device that the apparatus currently needs to access, or type information of a core network device that the apparatus currently needs to access.

It should be understood that the apparatus 700 herein is embodied in a form of functional units. The term "unit" herein may refer to an application-specific integrated circuit (ASIC), an electronic circuit, a processor (such as a shared processor, a dedicated processor, or a group processor) for executing one or more software or firmware programs, a memory, a merged logic circuit, and/or another appropriate component supporting the described functions. In an optional example, a person skilled in the art may understand that the apparatus 700 may be the terminal device in the foregoing embodiments, and the apparatus 700 may be configured to perform procedures and/or steps that correspond to the terminal device in the foregoing method embodiments. To avoid repetition, details are not described herein again.

Figure 8:
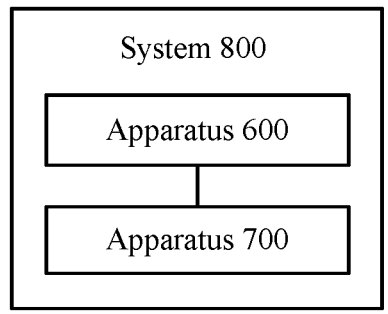
FIG. 8 is a schematic diagram of an information transmission system according to an embodiment of this application.

FIG. 8 is a schematic diagram of an information transmission system 800 according to an embodiment of this application. The system 800 includes the apparatus 600 and the apparatus 700.

The apparatus 600 or the apparatus 700 corresponds to the core network device or the terminal device in the method embodiments, and a corresponding unit performs a corresponding step. For example, a sending unit performs a sending step in the method embodiments, a receiving unit performs a receiving step in the method embodiments, and a processing unit performs another step other than the sending step and the receiving step. For a function of a specific unit, refer to a corresponding method embodiment. Details are not described again.

The core network device and the terminal device in the foregoing solutions have functions of implementing corresponding steps performed by the core network device and the terminal device in the foregoing methods. The functions may be implemented by hardware, or may be implemented by hardware by executing corresponding software. The hardware or software includes one or more units corresponding to the foregoing functions. For example, the sending unit may be replaced with a transmitter, the receiving unit may be replaced with a receiver, and another module such as the processing unit may be replaced with a processor, to separately perform a sending operation, a receiving operation, and a related processing operation in the method embodiments.

Figure 9:
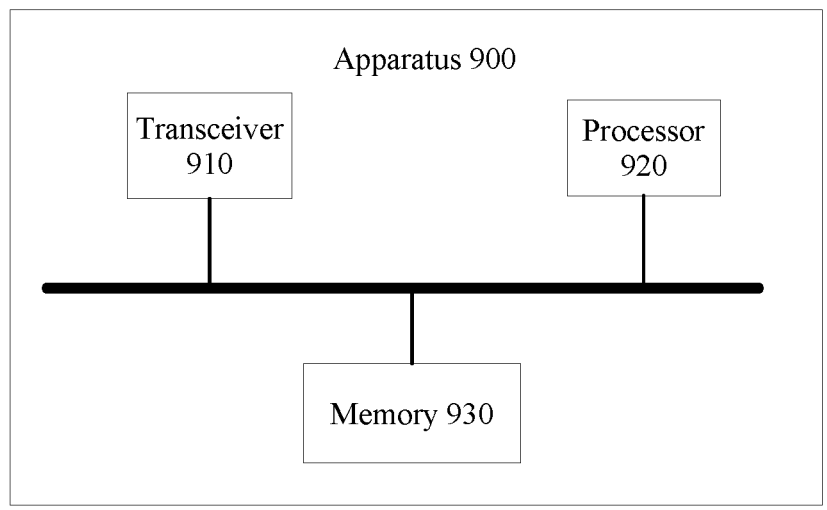
FIG. 9 is a schematic diagram of an information transmission apparatus according to an embodiment of this application.

FIG. 9 is a schematic block diagram of an information transmission apparatus 900 according to an embodiment of this application. For example, the apparatus may be the core network device in the method 200 to the method 500. As shown in FIG. 9, the apparatus 900 includes a transceiver 910, a processor 920, and a memory 930. The memory 930 is configured to store an instruction. The processor 920 is configured to execute the instruction stored in the memory 930, to control the transceiver 910 to receive a signal or send a signal.

The transceiver 910 is configured to obtain updated first network selection information of a terminal device. The transceiver 910 is further configured to obtain identifier information of at least one PLMN, and a correspondence between network slice selection assistance information and network selection information in the at least one PLMN. The network selection information in the at least one PLMN includes the updated first network selection information. The processor 920 is configured to determine, based on the updated first network selection information and the correspondence, target network slice selection assistance information corresponding to the at least one PLMN. The transceiver 910 is configured to send, to the terminal device, the identifier information of the at least one PLMN and the target network slice selection assistance information corresponding to the at least one PLMN.

It should be understood that the apparatus 900 may correspond to the core network device in the method 200 to the method 500, and can implement corresponding functions of core network management in the method 200 to the method 500. For brevity, details are not described herein again.

Figure 10:
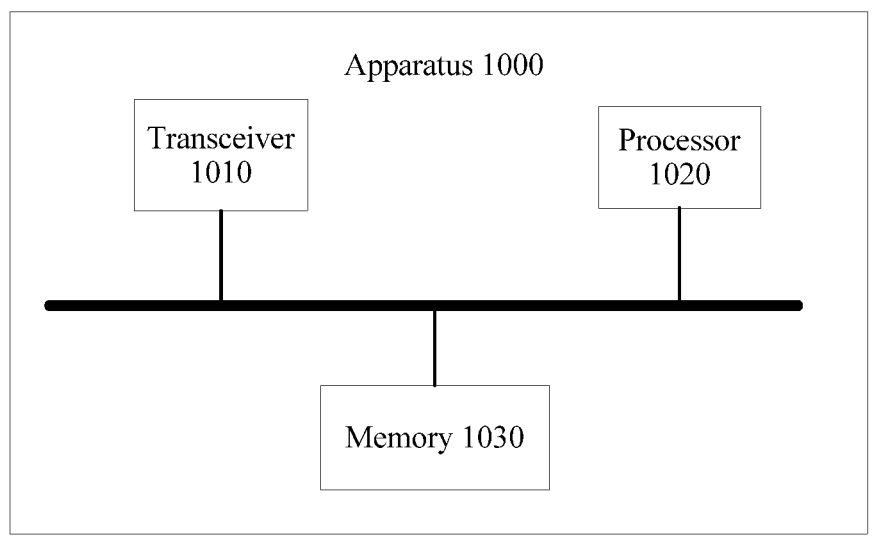
FIG. 10 is a schematic diagram of another information transmission apparatus according to an embodiment of this application.

FIG. 10 is a schematic block diagram of an information transmission apparatus 1000 according to an embodiment of this application. The apparatus may be the terminal device in the method 200 to the method 500. As shown in FIG. 10, the apparatus 1000 includes a transceiver 1010, a processor 1020, and a memory 1030. The memory 1030 is configured to store an instruction. The processor 1020 is configured to execute the instruction stored in the memory 1030, to control the transceiver 1010 to receive a signal or send a signal.

The transceiver 1010 is configured to receive identifier information of at least one PLMN and target network slice selection assistance information corresponding to the at least one PLMN that are sent by a core network device. The identifier information of the at least one PLMN and the target network slice selection assistance information corresponding to the at least one PLMN include identifier information of a first PLMN and first network selection assistance information corresponding to the first PLMN. The transceiver 1010 is further configured to obtain the identifier information of the first PLMN. The processor 1020 is configured to determine the first network selection assistance information based on the identifier information of the first PLMN. The transceiver 1010 is further configured to initiate an access request, and an access request message carries the first network selection assistance information.

It should be understood that the apparatus 800 may correspond to the terminal device in the method 200 to the method 500, and can implement corresponding functions of the terminal device in the method 200 to the method 500. For brevity, details are not described herein again.

It should be understood that in the embodiments of this application, the processor 920 and the processor 1020 each may be a central processing unit (CPU). Alternatively, the processor may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

A person of ordinary skill in the art may be aware that, in combination with the examples described in the embodiments disclosed in this specification, units and algorithm steps can be implemented by electronic hardware or a combination of computer software and electronic hardware. Whether the functions are performed using hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a Universal Serial Bus (USB) flash drive, a removable hard disk, a read-only memory (ROM), a random-access memory (RAM), a magnetic disk, or an optical disc.

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An information transmission method performed by a terminal device, comprising:
   determining whether the terminal device is in a data-connected state;
   receiving, from a core network device when the terminal device is in the data-connected state, a non-access stratum (NAS) message, wherein the NAS message comprises identifier information of at least one public land mobile network (PLMN) and target network slice selection assistance information corresponding to the at least one PLMN, wherein the identifier information of the at least one PLMN and the target network slice selection assistance information comprise first identifier information of a first PLMN and first network selection assistance information corresponding to the first PLMN;
   obtaining the first identifier information of the first PLMN when accessing the first PLMN;
   determining the first network selection assistance information based on the first identifier information of the first PLMN; and
   sending an access request message to an access network device, wherein the access request message carries the first network selection assistance information.

2. The method according to claim 1, wherein the at least one PLMN comprises a PLMN currently accessed by the terminal device or a PLMN alternatively accessed by the terminal device.

3. The method according to claim 1, wherein obtaining the first identifier information of the first PLMN comprises obtaining the first identifier information of the first PLMN from the core network device.

4. The method according to claim 1, further comprising receiving first indication information from the core network device, wherein the first indication information instructs the terminal device to store the identifier information of the at least one PLMN and the target network slice selection assistance information corresponding to the at least one PLMN.

5. The method according to claim 1, wherein network slice selection assistance information in the at least one PLMN comprises slice type information, second identifier information of a core network device that the terminal device currently needs to access, or type information of a core network device that the terminal device currently needs to access.

6. An information transmission apparatus, comprising:
   a memory storage comprising instructions; and
   one or more processors in communication with the memory and configured to execute the instructions to:
      determine whether the information transmission apparatus is in a data-connected state;
      receive, from a core network device when the information transmission apparatus is in the data-connected state, a non-access stratum (NAS) message, wherein the NAS message comprises identifier information of at least one public land mobile network (PLMN) and target network slice selection assistance information corresponding to the at least one PLMN, wherein the identifier information of the at least one PLMN and the target network slice selection assistance information comprise first identifier information of a first PLMN and first network selection assistance information corresponding to the first PLMN;
      obtain the first identifier information of the first PLMN when the information transmission apparatus accesses the first PLMN;
      determine the first network selection assistance information based on the first identifier information of the first PLMN; and
      send an access request message to an access network device, wherein the access request message carries the first network selection assistance information.

7. The information transmission apparatus according to claim 6, wherein the at least one PLMN comprises a PLMN currently accessed by the information transmission apparatus and/or a PLMN alternatively accessed by the information transmission apparatus.

8. The information transmission apparatus according to claim 6, wherein the one or more processors execute the instructions to obtain the first identifier information of the first PLMN from the core network device.

9. The information transmission apparatus according to claim 6, wherein the one or more processors execute the instructions to receive first indication information from the core network device, wherein the first indication information instructs the information transmission apparatus to store the identifier information of the at least one PLMN and the target network slice selection assistance information corresponding to the at least one PLMN.

10. The information transmission apparatus according to claim 6, wherein network slice selection assistance information in the at least one PLMN comprises slice type information, second identifier information of a core network device that the information transmission apparatus currently needs to access, or type information of a core network device that the information transmission apparatus currently needs to access.

11. A computer program product comprising computer-executable instructions for storage on a non-transitory computer-readable medium, that when executed by a processor, cause an apparatus to perform a method comprising:
    determining whether the apparatus is in a data-connected state;
    receiving, from a core network device when the apparatus is in the data-connected state, a non-access stratum (NAS) message, wherein the NAS message comprises identifier information of at least one public land mobile network (PLMN) and target network slice selection assistance information corresponding to the at least one PLMN, wherein the identifier information of the at least one PLMN and the target network slice selection assistance information comprise first identifier information of a first PLMN and first network selection assistance information corresponding to the first PLMN;

obtaining the first identifier information of the first PLMN when accessing the first PLMN;

determining the first network selection assistance information based on the first identifier information of the first PLMN; and sending an access request message to an access network device, wherein the access request message carries the first network selection assistance information.

12. The computer program product according to claim 11, wherein the at least one PLMN comprises a PLMN currently accessed by the apparatus and/or a PLMN alternatively accessed by the apparatus.

13. The computer program product according to claim 12, wherein the PLMN alternatively accessed by the apparatus is accessible to the apparatus in a roaming area.

14. The computer program product according to claim 11, wherein the method further comprises obtaining the first identifier information of the first PLMN from the core network device.

15. The computer program product according to claim 11, wherein the method further comprises receiving first indication information from the core network device.

16. The computer program product according to claim 15, wherein the first indication information instructs the apparatus to store the identifier information of the at least one PLMN and the target network slice selection assistance information corresponding to the at least one PLMN.

17. The computer program product according to claim 11, wherein network slice selection assistance information in the at least one PLMN comprises slice type information.

18. The computer program product according to claim 11, wherein network slice selection assistance information in the at least one PLMN comprises second identifier information of a core network device that the apparatus currently needs to access.

19. The computer program product according to claim 11, wherein network slice selection assistance information in the at least one PLMN comprises type information of a core network device that the apparatus currently needs to access.

20. The computer program product according to claim 11, wherein the core network device is an access and mobility management function (AMF) device.

* * * * *